US012763321B2

(12) United States Patent
Jiang et al.

(10) Patent No.: US 12,763,321 B2
(45) Date of Patent: Oct. 13, 2026

(54) BATTERY ANODE WITH ALTERNATING ACTIVE LAYERS

(71) Applicant: GM GLOBAL TECHNOLOGY OPERATIONS LLC, Detroit, MI (US)

(72) Inventors: Meng Jiang, Rochester Hills, MI (US); Xiaosong Huang, Novi, MI (US); Bradley R. Frieberg, Farmington Hills, MI (US); Louis G. Hector, Jr., Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 674 days.

(21) Appl. No.: 18/354,120

(22) Filed: Jul. 18, 2023

(65) Prior Publication Data

US 2025/0029984 A1 Jan. 23, 2025

(51) Int. Cl.

| | |
|---|---|
| ***B33Y 10/00*** | (2015.01) |
| ***B33Y 80/00*** | (2015.01) |
| ***H01M 4/04*** | (2006.01) |
| ***H01M 4/133*** | (2010.01) |
| ***H01M 4/134*** | (2010.01) |
| ***H01M 4/1393*** | (2010.01) |
| ***H01M 4/1395*** | (2010.01) |
| ***H01M 4/36*** | (2006.01) |

(Continued)

(52) U.S. Cl.
CPC ............. *H01M 4/366* (2013.01); *B33Y 10/00* (2014.12); *B33Y 80/00* (2014.12); *H01M 4/0404* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/587* (2013.01); *H01M 2004/027* (2013.01)

(58) Field of Classification Search
CPC .... H01M 4/366; H01M 4/0404; H01M 4/133; H01M 4/134; H01M 4/1393; H01M 4/1395; H01M 4/386; H01M 4/587; H01M 4/625; H01M 4/364; H01M 4/13; H01M 4/667; H01M 10/0525; H01M 2004/027; H01M 2004/021; H01M 2004/028; B33Y 10/00; B33Y 80/00; Y02E 60/10
See application file for complete search history.

(56) References Cited

U.S. PATENT DOCUMENTS

| | | | | |
|---|---|---|---|---|
| 2018/0261851 A1* | 9/2018 | Huang | .................. | H01M 4/244 |
| 2022/0149390 A1* | 5/2022 | Chopra | .................. | H01M 6/40 |

(Continued)

FOREIGN PATENT DOCUMENTS

| | | |
|---|---|---|
| WO | 2020102677 A1 | 5/2020 |

*Primary Examiner* — Maria Laios
*Assistant Examiner* — Andrew Kim
(74) *Attorney, Agent, or Firm* — Quinn IP Law

(57) ABSTRACT

An anode for a rechargeable battery cell includes an electrode substrate and a current collector fixed to the electrode substrate. The anode also includes an active layer arranged on the current collector and having discrete first material sections and second material sections arranged in an alternating pattern. Each discrete material section is aligned perpendicular to the current collector. The active layer is configured to intercalate transient ions during charging of the battery cell and de-intercalate the transient ions during discharging of the battery cell. A method of manufacturing such an anode for a rechargeable battery cell is also considered.

13 Claims, 6 Drawing Sheets

(51) Int. Cl.

| | |
|---|---|
| ***H01M 4/38*** | (2006.01) |
| ***H01M 4/587*** | (2010.01) |
| *H01M 4/02* | (2006.01) |

(56) References Cited

U.S. PATENT DOCUMENTS

2022/0190322 A1* 6/2022 Zhamu .................. H01M 4/624
2023/0064681 A1* 3/2023 Akira ...................... H01M 4/10

* cited by examiner

BATTERY ANODE WITH ALTERNATING ACTIVE LAYERS

INTRODUCTION

The present disclosure relates to a battery anode with alternating active layers and a method of fabricating the same.

Electrochemical energy storage devices, such as lithium-ion batteries, may be used to power such diverse items as toys, consumer electronics, and motor vehicles. Typically, a battery includes two electrodes, as well as an electrolyte component and/or a separator. One of the two electrodes generally serves as a positive electrode or cathode, and the other electrode serves as a negative electrode or anode. Electrochemical battery cells may be broadly classified into primary and secondary batteries. Primary batteries, also referred to as disposable batteries, are intended to be used until depleted, after which they are replaced with new batteries. Secondary batteries, more commonly referred to as rechargeable batteries, employ specific chemistries permitting such batteries to be repeatedly recharged and reused.

Rechargeable batteries may be in a solid form, a liquid form, or a solid-liquid hybrid. A separator and/or electrolyte may be disposed between the anode and the cathode. In rechargeable lithium-ion batteries, the electrolyte is typically employed for conducting lithium ions between the electrodes. Generally, lithium-ion batteries operate by reversibly passing lithium ions back and forth between the anode and the cathode. For example, lithium ions may move from the cathode to the anode during charging of the battery and in the opposite direction when the battery is discharged. The ability of battery electrodes to repeatedly insert or intercalate into their respective structures and extract therefrom or de-intercalate lithium ions is determinative of practical long-term charging capacity of the battery cell. Accordingly, material depletion in the respective electrode structure during extended cycling may negatively impact a lasting performance of the battery cell.

SUMMARY

An anode for a rechargeable battery cell includes an electrode substrate and a current collector fixed to the electrode substrate. The anode also includes an active layer arranged on the current collector and having discrete first material sections and second material sections arranged in an alternating pattern. Each discrete material section is aligned perpendicular to the current collector. The active layer is configured to intercalate transient ions during charging of the battery cell and de-intercalate the transient ions during discharging of the battery cell.

Each of the first material sections may include graphite and each of the second material sections may include silicon.

Each of the second material sections may include either pure silicon, silicon alloy, $SiO_x$ (silicon oxide), $LiSiO_x$ (lithium silicon oxide), or Si—C (silicon carbon composite).

The active layer may be defined by a length, a width, and a height. Multiple first and multiple second material sections may fit across the length and/or the width of the active layer.

The alternating pattern may be a chessboard pattern, such that each of the discrete first material sections and second material sections has a column or pillar structure. In such an embodiment, multiple first and multiple second material sections fit across each of the length and the width of the active layer.

The alternating pattern may be a layered pattern, such that each of the discrete first material sections and second material sections spans at least one of the length and the width of the active layer.

Each of the first material and second material may include respective conductivity enhancement particles and a polymer binder.

The active layer may be generated via 3D printing of the respective first and second material sections.

The active layer may be generated via co-extrusion printing of the respective first and second material sections.

The active layer may be generated via direct laser melting of the respective first and second material sections.

A method of manufacturing such an anode for a rechargeable, e.g., lithium-ion, battery cell is also considered.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Those having ordinary skill in the art will recognize that terms such as “above”, “below”, “upward”, “downward”, “top”, “bottom”, “left”, “right”, etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
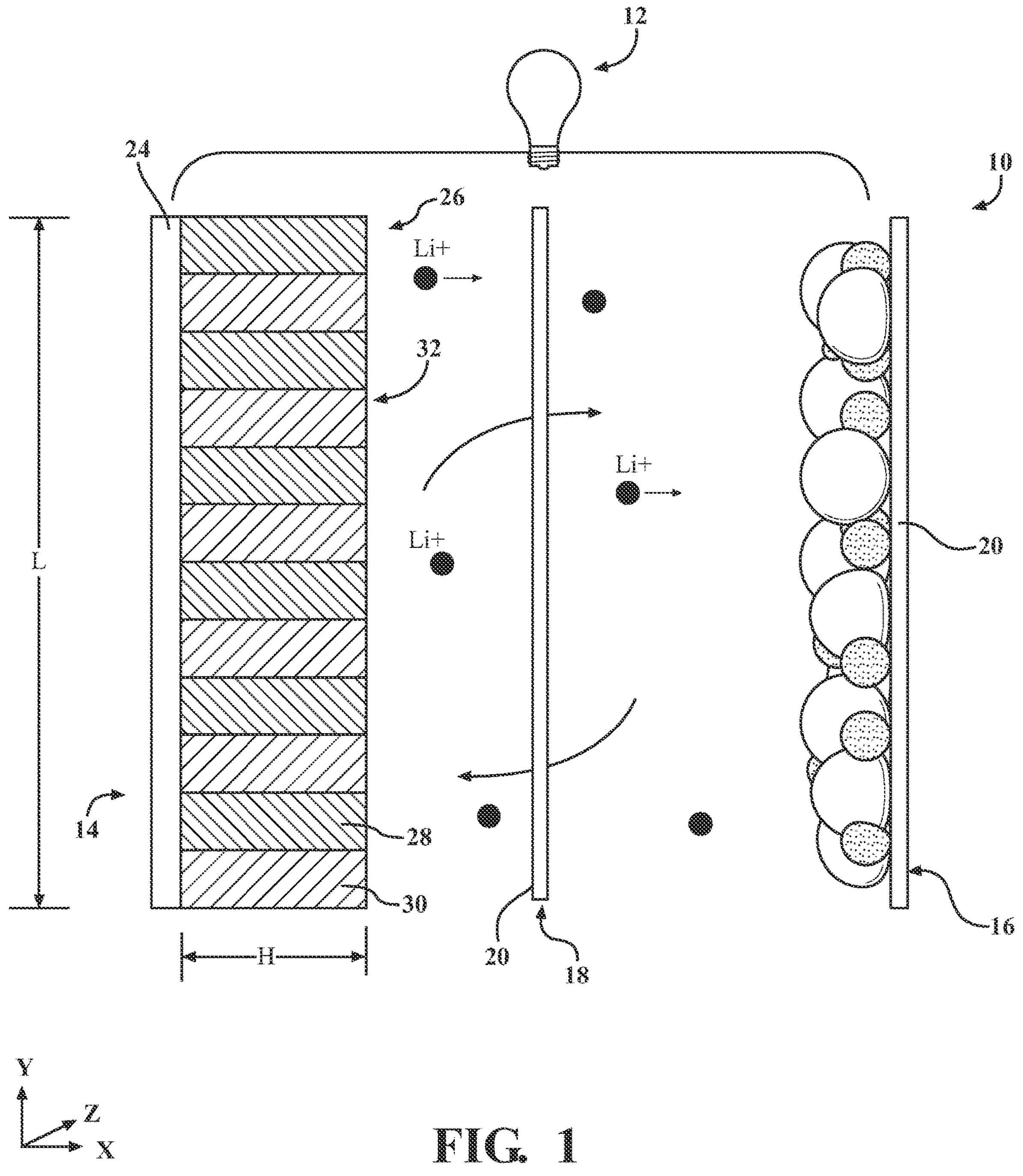
FIG. 1 is a schematic view of an electrical energy storage cell powering a load, the energy storage cell being shown as a lithium-ion (Li-Ion) battery with an anode constructed from first material sections and second material sections arranged in an alternating pattern and aligned perpendicular to a current collector, according to the disclosure.

Referring to FIG. 1, an electrical energy storage cell 10 powering a load 12 is depicted. As shown, the electrical energy storage cell 10 has an anode (negative electrode) 14, a cathode (positive electrode) 16, and one of a solid, liquid, gel, and polymer non-aqueous, e.g., polymer-based, electrolyte 18 surrounding the anode, cathode, and saturating a separator 20. The storage cell 10 is specifically shown as a lithium-ion (Li-Ion) battery. The anode 14 may be constructed from lithium, graphite, silicon, silicon oxide and various other suitable materials. While the cathode 16 is frequently constructed from Li-ion battery cathode material, such as lithium manganese oxide, lithium iron phosphate, lithium nickel/manganese/cobalt oxide, a variety of other suitable materials may also be used.

Li-Ion batteries are rechargeable electrochemical batteries notable for their high specific energy and low self-discharge. The Li-Ion batteries may be used to power such diverse items as toys, consumer electronics, and motor vehicles. Although the electrical energy storage cell 10 is specifically shown as a Li-Ion battery, broadly considered, other battery chemistries and corresponding structures are also envisioned. The subject vehicle may include, but not be limited to, a commercial vehicle, industrial vehicle, passenger vehicle, aircraft, watercraft, train or the like. It is also contemplated that the vehicle may be a mobile platform, such as an airplane, all-terrain vehicle (ATV), boat, personal movement apparatus, robot and the like, as a suitable application for the present disclosure.

In Li-Ion batteries, lithium ions move from the anode 14 through the electrolyte 18 to the cathode 16 during discharge, and back when charging. Li-Ion batteries use a lithium metal oxide, such as Li-NMC, Li-NMCA, LMO, NMO, LFP etc., as the material for the positive electrode and typically graphite for the negative electrode. Generally, the reactants in the electrochemical reactions in a Li-Ion cell 10 are the materials of anode and cathode, both of which are compounds that may host lithium atoms, with the reactions taking place at the electrode particle/electrolyte interface. During discharge, an oxidation half-reaction at the anode 14 produces positively charged lithium ions and negatively charged electrons. Lithium ions move through the electrolyte 18, electrons move through an external circuit (including a connection to the electrical load 12 or to a charging device), and then they recombine at the cathode (together with the cathode material) in a reduction half-reaction.

The electrolyte 18, current collectors (discussed below), and the external circuit provide conductive media for lithium ions and electrons, respectively, but do not partake in the electrochemical reaction. Generally, during discharge of an electrochemical battery cell, electrons flow between the electrodes, from the anode 14 toward the cathode 16, through the external circuit. The reactions during discharge lower the chemical potential of the cell, so discharging transfers energy from the cell to wherever the electric current dissipates its energy, mostly in the external circuit. During charging, the described reactions and transports go in the opposite direction: electrons move from the positive electrode to the negative electrode through the external circuit. To charge the cell, the external circuit provides electric energy. This energy is then stored (with some loss) as chemical energy in the cell.

In a Li-Ion cell, both the anode 14 and cathode 16 allow lithium ions to move in and out of their structures via a process called insertion (intercalation) or extraction (deintercalation), respectively. Typically, the anode 14 employs a current collector, which may be manufactured from copper foil (generally, 8-12 microns thick), and includes an active layer using silicon and graphite materials configured to intercalate lithium ions. During charging, lithium bonds to silicon, which leads to significant swelling of the silicon. Specifically, a silicon anode reacts with lithium via intermetallic alloying, causing silicon to expand up to three-times its original volume. Over an extended number of charge-discharge cycles, the subject swelling of silicon may result in delamination of anode active material from the current collector and, consequently, disintegration of the negative electrode structure. As a result, the structural integrity and cycling capacity of a Li-Ion battery cell 10 will be negatively affected.

A specific construction of the anode 14 to be described below is configured to minimize the possibility of delamination of anode active material from the current collector and disintegration of the negative electrode structure during battery cell 10 charge/discharge cycling. As shown in FIG. 1, the subject anode 14 includes an electrode substrate or current collector 24, which may be constructed from a section of metal foil (generally identified as a current collector foil). Typically, current collectors are independently manufactured, e.g., aluminum foils for cathodes and copper foils for anodes, either via rolling or by electrodeposition. The current collector 24 may be composed of or constructed from copper.

Figure 4:
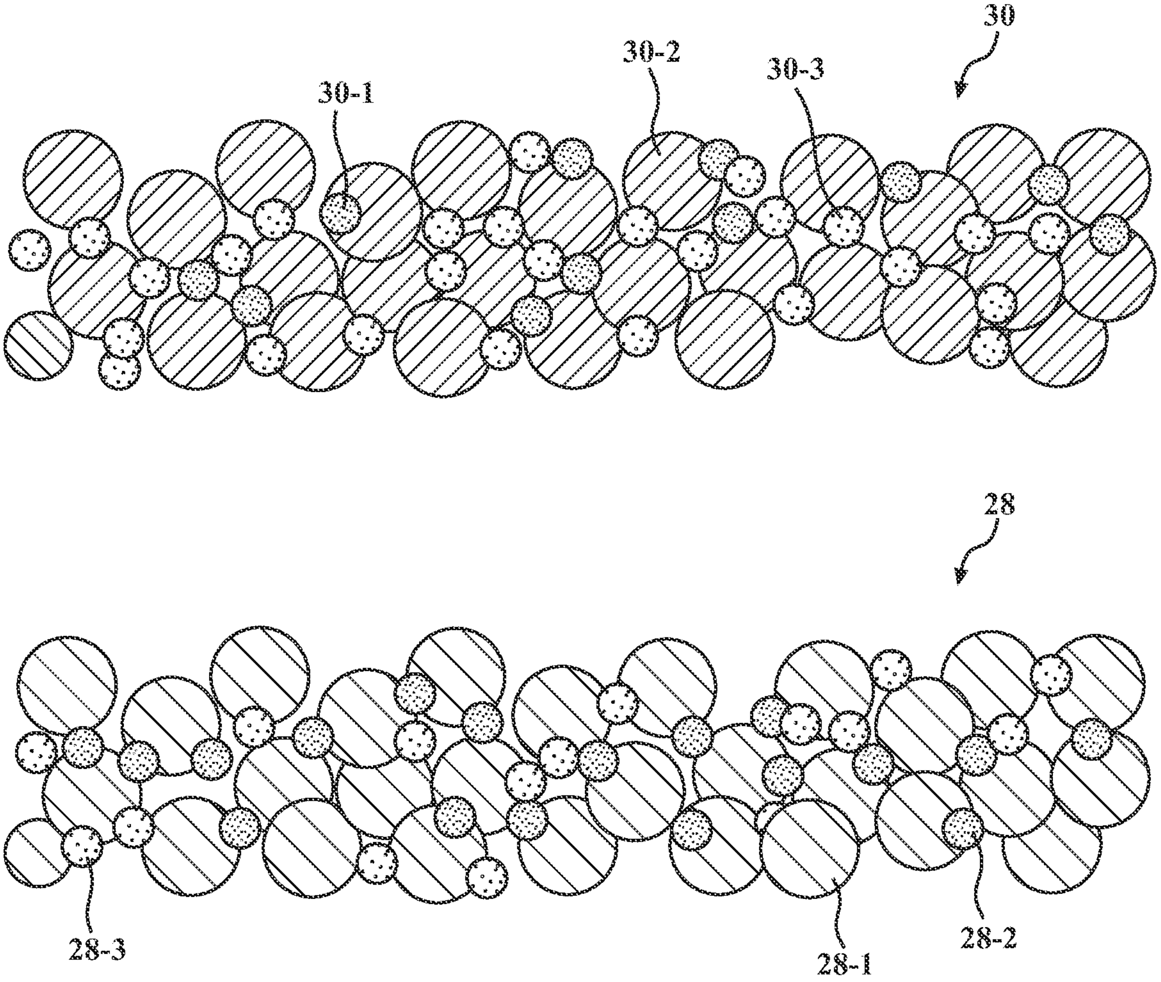
FIG. 4 is a schematic close-up view of the anode structure including conductivity enhancement and binder particles, according to the disclosure.

The subject anode 14 also includes an active layer 26 arranged on and fixed to the current collector 24. As shown in FIG. 1, the active layer 26 includes discrete multiple first material sections 28 and multiple second material sections 30 arranged in an alternating pattern 32. With particular reference to FIG. 4, the first material sections 28 may be graphite or graphite-containing sections additionally including a binder 28-1, active material particles 28-2, and conductivity additive, i.e., enhancement, particles 28-3. The second material sections 30 may be silicon or silicon-containing sections additionally including a binder 30-1, active material particles 30-2, and conductivity enhancement particles 30-3. Each second material section 30 may include either pure silicon, silicon alloy, $SiO_x$ (silicon oxide), $LiSiO_x$ (lithium silicon oxide), or Si—C (silicon carbon composite).

The binder 28-1 and 30-1 may be polyvinylidene fluoride (PVDF), carboxymethyl cellulose (CMC), styrene-butadiene rubber (SBR), lithium polyacrylate (Li-PAA), sodium polyacrylate (Na-PAA), polytetrafluroethylene (PTFE), etc., the active material particles 28-2 and 30-2 (graphite, hard carbon, LTO, Si, lithium metal, Sn, etc.), and the conductivity enhancement particles 28-3 and 30-3 may be carbon black, graphene, graphene nanoplatelets, carbon nanotubes, carbon fiber, etc. The alternating pattern 32 is specifically configured to align each material section 28, 30 perpendicular to the current collector 24. The resulting active layer 26 is thereby configured to store transient, e.g., lithium, ions during charging of the battery cell 10, when, for example, the graphite anode intercalates lithium transient ions into interstices of its crystalline structure active layer and the silicon anode material reacts with lithium and relinquishes the lithium during charging of the battery cell. The alternating pattern 32 of the first material sections 28 and second material sections 30 is intended to constrain swelling of the silicon and minimize the possibility of anode delamination.

Figure 2:
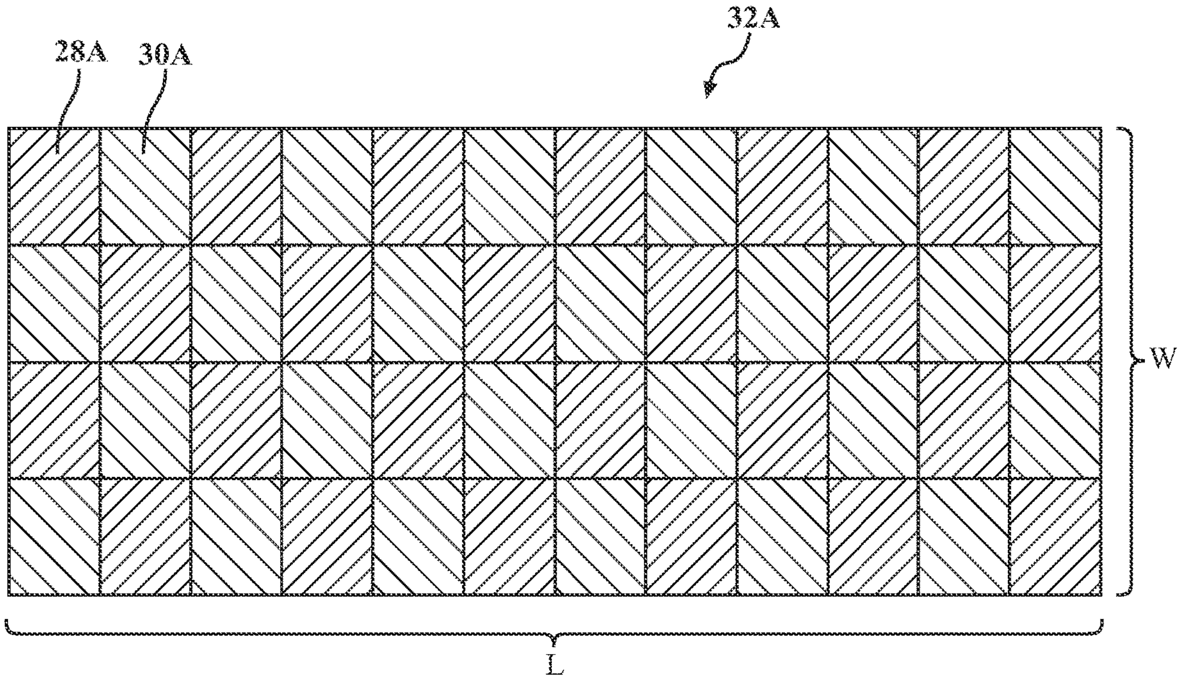
FIG. 2 is a schematic close-up plan view of the anode shown in FIG. 1, wherein the alternating pattern is a chessboard pattern, according to one embodiment of the disclosure.
Figure 3:
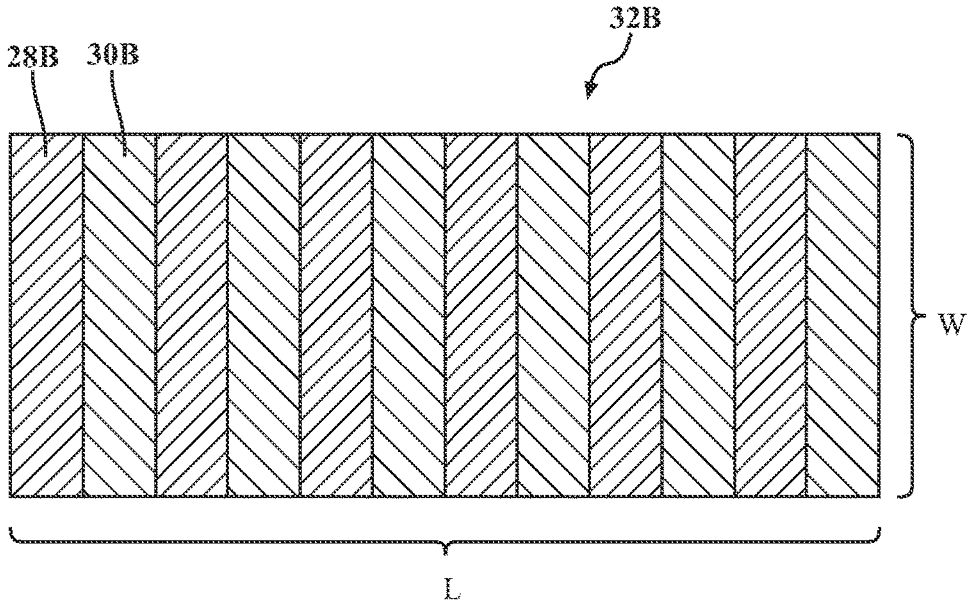
FIG. 3 is a schematic close-up plan view of the anode shown in FIG. 1, wherein the alternating pattern is a layered pattern, according to another embodiment of the disclosure.

The active layer 26 may be defined by a height H (shown in FIG. 1, as well as a length L and a width W (shown in FIGS. 2 and 3). As shown in FIGS. 2 and 3, the discrete multiple first and multiple second material sections 28, 30 fit across at least one of the length L and the width W of the active layer 26. The alternating pattern 32 may specifically be a chessboard pattern 32A, as shown in a plan view in FIG. 2. The chessboard pattern 32A positions each of the discrete first material sections 28 and second material sections 30 as a respective column or pillar, e.g., oriented substantially vertically relative to the current collector 24, structure 28A, 30A. In such an arrangement, the multiple first and multiple second material sections 28, 30 fit across each of the length L and the width W of the active layer 26. As may be seen in FIG. 1, each of the first material (e.g., graphite) sections 28 is positioned perpendicular to and in direct contact with the current collector 24, thereby ensuring reliable adhesion of the active layer 26 thereto during battery cell cycling.

Alternatively, the alternating pattern 32 may be a layered pattern 32B, as shown in a plan view in FIG. 3. The layered pattern 32B positions each of the discrete multiple first material sections 28 and multiple second material sections 30 spanning one of the length L and the width W of the active layer 26. In other words, the first material sections 28 and second material sections 30 may be arranged either parallel to the width W (shown in FIG. 3) or to the length L (not shown but may be visualized by analogy). As a result, similarly to the embodiment of FIG. 2, in the layered pattern 32B each of the first material (e.g., graphite) sections 28 is positioned perpendicular to and in direct contact with the current collector 24, ensuring reliable adhesion of the active layer 26 thereto during battery cell cycling.

Figure 5:
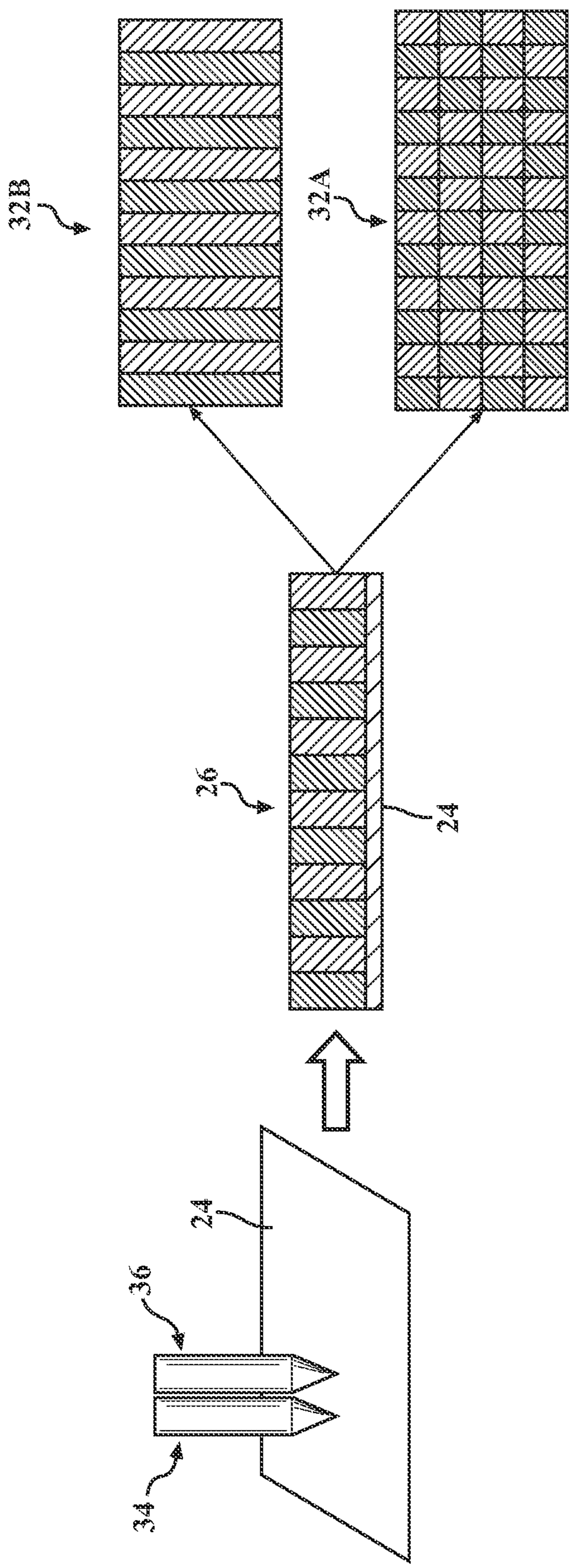
FIG. 5 generally illustrates 3D printing and co-extrusion printing manufacturing processes for constructing the electrode shown in FIGS. 1-4, according to the disclosure.

The active material sections 28, 30 of the active layer 26 may be applied as a coating or otherwise deposited on the current collector 24, such that the active material sections become arranged thereon in the alternating pattern 32. For example, the active layer 26 may be generated via 3D printing of the respective first and second material sections 28, 30, as generally represented by FIG. 5. In another embodiment, which may also be represented by FIG. 5, the active layer 26 may be generated via co-extrusion printing of the respective first and second material sections 28, 30. Alternatively, in a third embodiment, shown in FIG. 6, the active layer 26 may be generated via direct laser melting of the respective first and second material sections 28, 30.

As a result, charging of the battery cell 10 employing the subject anode 14 reversibly deposits transient (such as lithium) ions onto each of the active material sections 28, 30. During charging of the battery cell 10, the active material sections 28 constrain the swelling of the active material sections 30, thereby maintaining structural integrity of the active material current collector. During discharge of the battery cell 10 employing the subject anode 14 the transient ions are extracted from the active material sections 28, 30. Accordingly, the battery cell 10 may undergo repeated cycles of intercalation and deintercalation of lithium ions in the process of accepting charge from an external energy source, such as an electrical grid, and then supply the charge to power the load 12.

Figure 6:
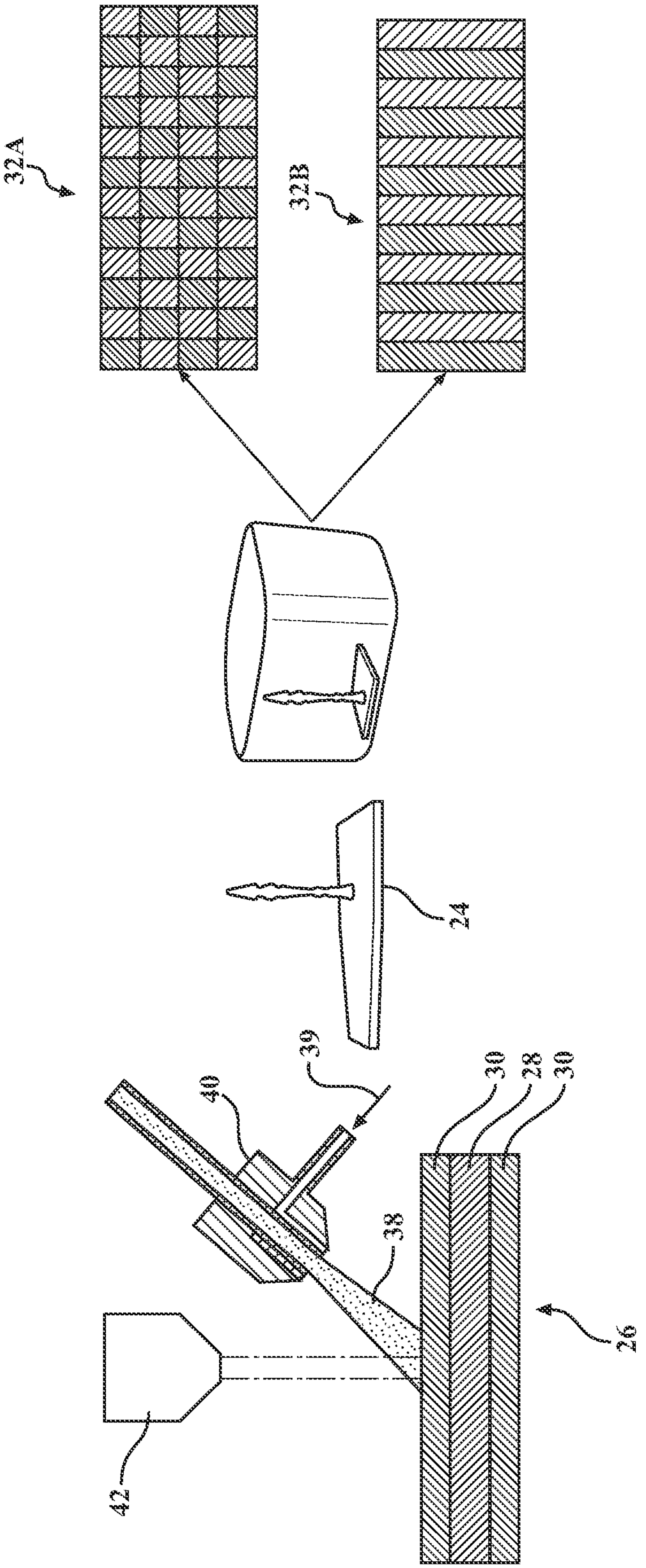
FIG. 6 illustrates a direct laser melting manufacturing process for constructing the electrode shown in FIGS. 1-4, according to the disclosure.
Figure 7:
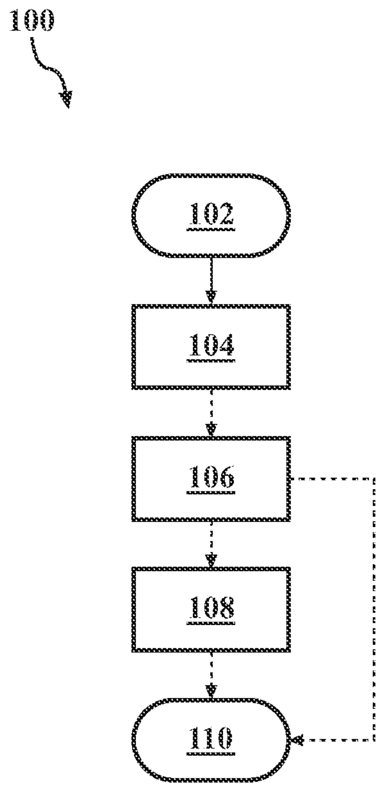
FIG. 7 illustrates a flowchart for a method of manufacturing a rechargeable battery cell anode having the alternating pattern structure shown in FIGS. 1-4 and employing devices and processes depicted in FIGS. 5-6.

A method 100 of manufacturing the anode 14 for a rechargeable battery cell 10 is depicted in FIG. 7 and disclosed in detail below. Method 100 is generally intended for generating the active layer structure 26 on the current collector 24, as described above with respect to FIGS. 1-6. Method 100 commences in frame 102 with providing the current collector 24, for example, by arranging the current collector on an appropriate assembly or process fixture. Following frame 102, the method advances to frame 104. In frame 104, the method includes depositing onto the current collector 24 the active layer 26 having the discrete first and second material sections 28, 30. In frame 104 the method also includes arranging the first and second material sections 28, 30 in the alternating pattern 32 and aligning each of the subject material sections perpendicular to the current collector 24 to generate the anode 14.

As described above with respect to FIG. 2, the alternating pattern 32 may be the chessboard pattern 32A, which positions each of the discrete first material sections 28 and second material sections 30 as a respective column or pillar structure 28A, 30A. Accordingly, arranging the first and second material sections 28, 30 fits multiple first and multiple second sections across each of the length L and the width W of the active layer 26. As described above with respect to FIG. 3, the alternating pattern 32 may be the layered pattern 32B, which positions each of the first material sections 28 and material sections 30 to span either the length L or the width W of the active layer 26. In the layered pattern 32B, the first and second material sections 28, 30 are arranged parallel to the length L or to the width W. In each of the chessboard pattern 32A and the layered pattern 32B, the method deposits the first and second material sections 28, 30 side by side and perpendicular to the current collector 24.

In frame 104, the method may deposit the active layer 26 onto the current collector 24 via 3D printing of the respective first and second material sections 28, 30, as shown in FIG. 5. Specifically, 3D printing of the respective first and second material sections 28, 30 may be accomplished either concurrently or sequentially via individual devices 34, 36. e.g., sprayers. Alternatively, the method may deposit the active layer 26 onto the current collector 24 by co-extrusion printing of the respective first and second material sections 28, 30, as shown in FIG. 5. Co-extrusion printing of the respective first and second material sections 28, 30 may be accomplished either concurrently or sequentially via individual nozzles, which may also be represented via the devices 34, 36 shown in FIG. 5. Separately, the active layer 26 may be deposited onto the current collector 24 by direct laser melting of the respective first and second material sections 28, 30, as shown in FIG. 6. The materials of the first and second material sections 28, 30 may be sequentially deposited onto the current collector 24 by melting a stream 38 of powder with Argon shielding gas emitted through a nozzle 40 or individual bars or segments of corresponding material via a laser light source 42.

From frame 104, after deposition of the active layer 26 onto the current collector 24, the method may proceed to frame 106. As described with respect to FIGS. 1-4, the discrete first material section 28 of the active layer 26 may include graphite, binder 28-1, active material particles 28-2, and conductivity enhancement particles 28-3. Also, the discrete second material sections 30 may include silicon, binder 30-1, active material particles 30-2, and conductivity enhancement particles 30-3. In frame 106, the method includes drying the anode 14 to solidify graphite, binder 28-1, active material particles 28-2, and conductivity enhancement particles 28-3, such as in an oven. After frame 106, the method may conclude in frame 108 or proceed to incorporation of the completed anode 14 into the battery cell 10 in frame 110.

When the resultant anode 14 is employed in the battery cell 10, charging of the battery cell reversibly intercalates transient ions into the first and second material sections 28, 30. The alternating pattern 32 of the active layer 26 constrains expansion or swelling of the second, e.g., silicon, material sections 30 via its being bounded by the adjacent first material sections 28. Conversely, discharging of the battery cell 10 extracts transient ions out of the first and second material sections 28, 30. The active layer 26 with the alternating pattern 32 generated by the method 100 is intended to facilitate an increased number of charge-discharge cycles in the battery cell 10 by minimizing the possibility of anode active material's delamination from the current collector and disintegration of the negative electrode structure. As a result, structural integrity and cycling capacity of the host battery cell 10 would be enhanced.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An anode for a rechargeable battery cell, comprising:
an electrode substrate;
a current collector fixed to the electrode substrate; and
an active layer arranged on the current collector and having discrete first material sections and second material sections arranged in an alternating pattern;
wherein:
each material section is aligned perpendicular to the current collector;
the active layer is defined by a length, a width, and a height;
the alternating pattern is a chessboard pattern, such that each of the discrete first material sections and second material sections has a column structure;
multiple first and multiple second material sections fit across each of the length and the width of the active layer; and
the active layer is configured to intercalate transient ions during charging of the battery cell and de-intercalate the transient ions during discharging of the battery cell.

2. The anode according to claim 1, wherein each of the first material sections includes graphite and each of the second material sections includes silicon.

3. The anode according to claim 2, wherein each of the second material sections includes one of pure silicon, silicon alloy, $SiO_x$ (silicon oxide), $LiSiO_x$ (lithium silicon oxide), and Si—C (silicon carbon composite).

4. The anode according to claim 1, wherein each of the first material and second material includes respective conductivity enhancement particles and a polymer binder.

5. The anode according to claim 1, wherein the active layer is generated via 3D printing of the respective first and second material sections.

6. The anode according to claim 1, wherein the active layer is generated via co-extrusion printing of the respective first and second material sections.

7. The anode according to claim 1, wherein the active layer is generated via direct laser melting of the respective first and second material sections.

8. A method of manufacturing an anode for a rechargeable battery cell, the method comprising:
providing a current collector; and
depositing onto the current collector an active layer having discrete first and second material sections, including arranging in an alternating pattern and aligning perpendicular to the current collector the first and second material sections to generate the anode;
wherein:
the active layer is defined by a length, a width, and a height;
the alternating pattern is a chessboard pattern of the first and second material sections, such that each of the discrete first material sections and second material sections has a column structure; and
arranging in the alternating pattern and aligning perpendicular to the current collector each of the discrete first and second material sections includes fitting multiple first and multiple second material sections across each of the length and the width of the active layer.

9. The method according to claim 8, wherein each of the first material sections includes graphite and each of the second material sections includes one of pure silicon, silicon alloy, $SiO_x$ (silicon oxide), $LiSiO_x$ (lithium silicon oxide), and Si—C (silicon carbon composite).

10. The method according to claim 8, wherein depositing the active layer onto the current collector includes 3D printing of the respective first and second material sections.

11. The method according to claim 8, wherein depositing the active layer onto the current collector includes co-extrusion printing of the respective first and second material sections.

12. The method according to claim 8, wherein depositing the active layer onto the current collector includes direct laser melting of the respective first and second material sections.

13. An anode for a rechargeable battery cell, comprising:
an electrode substrate; and
a current collector fixed to the electrode substrate; and
an active layer defined by a length, a width, and a height arranged on the current collector and having discrete graphite-containing sections and silicon-containing sections arranged in an alternating pattern;
wherein:
each of the graphite-containing and silicon-containing sections is aligned perpendicular to the current collector;
the alternating pattern is a chessboard pattern and each of the discrete graphite-containing material sections and silicon-containing material sections has a column structure, such that multiple graphite-containing and the multiple silicon-containing material sections fit across each of the length and the width of the active layer; and
the active layer is configured to intercalate lithium ions during charging of the battery cell and de-intercalate the lithium ions during discharging of the battery cell.

* * * * *